(12) United States Patent
Clarke

(10) Patent No.: X5267
(45) Date of Patent: Nov. 7, 1828

(54) COLLARS, FOR DRESS COATS

(76) Inventor: Henry Clarke

Henry Clark
Letters Patent

The Schedule referred to in these Letters Patent and making part of the same containing a description in the words of the said Henry Clark himself of his improvement in the collars for dress Coats & outer Garments The aforesaid Collars, are to be manufactured from wool, fur, and hair, separately, or combined; in the same manner that the said materials are now manufactured into hats; and to be worked on blocks shaped to any pattern you design for the collar; and stiffened with the Kind of stiffening known by the name of "water proof" Exd.
M.G.

Witnesses
Sylvester Barrows
David Clark

Henry Clark (112 Words)